Sept. 29, 1953     D. L. HANNA ET AL     2,653,904
PROCESS FOR REFINING CHLORINATED BENZENES
Filed Jan. 22, 1952
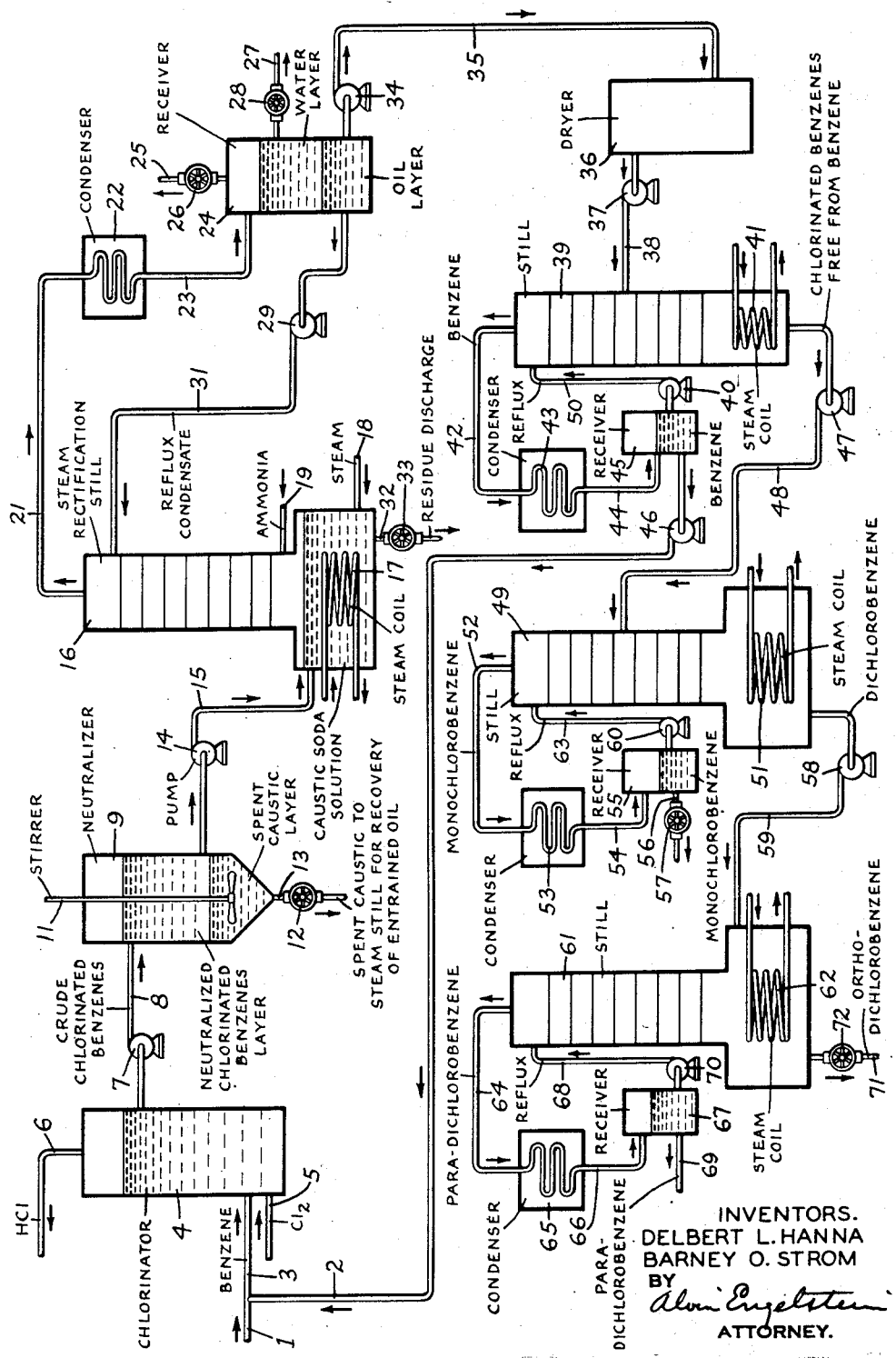
INVENTORS.
DELBERT L. HANNA
BARNEY O. STROM
BY
ATTORNEY.

Patented Sept. 29, 1953

2,653,904

UNITED STATES PATENT OFFICE 2,653,904

PROCESS FOR REFINING CHLORINATED BENZENES

Delbert L. Hanna and Barney O. Strom, Syracuse, N. Y., assignors to Allied Chemical & Dye Corporation, New York, N. Y., a corporation of New York Application January 22, 1952, Serial No. 267,604

6 Claims. (Cl. 202—57)

This invention relates to a method of refining nuclear chlorinated aromatic hydrocarbons and more particularly refers to a new and improved method of separating desired chlorinated benzene products from a crude chlorinated benzene mixture.

In the reaction of benzene with chlorine to produce monochlorobenzene and dichlorobenzene there results a mixture of compounds due to the formation of more than one isomer in some cases, and due to the presence of unchlorinated hydrocarbons and the presence of compounds containing various amounts of chlorine. When pure compounds of the nuclear chlorinated aromatic type are desired, it is necessary to resort to a separation procedure to separate the pure compounds from the crude chlorinated mixture. The conventional method for accomplishing this is fractional distillation.

The preparation of nuclear chlorinated aromatic hydrocarbons in pure form by fractional distillation would be a relatively simple matter except for the presence of impurities consisting of other types of compounds which are found in the chlorinated crude. These impurities may arise in part from side reactions as well as being formed by the action of chlorine on impurities present in the original raw material. Although the amount of impurities in crude chlorinated benzene is small, generally less than 1%, it consists of a multitude of individual compounds of varying physical properties as will be seen from the following partial list of compounds identified in crude chlorinated benzene:

FeCl
CS$_2$ and other sulfur compounds
Aliphatic hydrocarbons including n-hexane, cyclohexane and n-heptane
Meta-dichlorobenzene
1,2,4- and 1,2,3-trichlorobenzene
Ortho- and para-chlorotoluene
Dichlorotoluenes
Bromobenzene
Ortho- and para-chlorobromobenzenes
2,3,5-trichlorothiophene
Tetrachlorothiophene
Addition compounds of benzene and thiophene
Chlorinated aliphatics
Substituted aromatics
Colored substances and tars The significance of the presence of impurities in the chlorinated crude lies in the fact that on application of heat, as in the distillation process, they break down with the evolution of compounds which have a corrosive action on the equipment. Since the chemical identity of the compounds causing corrosion is obscure, for convenience they will be termed "corrosive impurities."

Conventional fractionating methods were applied to effect separation of pure chlorinated benzene products from the crude chlorinated benzene with the result of frequent shut down and replacement of equipment due to the severe corrosive action of the corrosive impurities in the crude. Monel metal was substituted for the condensers and reflux lines of the fractionating equipment, but apparently due to the nature and wide variety of corrosive materials the Monel metal failed after six months—previously, with steel equipment failure occurred after a period of about 2 months' operation. Other non-corrosive materials such as graphite, glass or tantalum, were suggested but the cost of such construction would be too high and not suitable for the conditions of operation. In our attempts to solve the corrosion problem in the refining of crude chlorinated benzene, we distilled the crude chlorinated benzene in the presence of caustic soda, and also used organic bases such as triethanolamine to neutralize the corrosive constituents but without success in retarding rapid corrosion of the equipment.

A primary object of the present invention is to provide an economical process of minimizing corrosion of equipment during the refining of crude chlorinated benzenes and to produce chlorinated benzenes substantially free from corrosive impurities.

Other objects and advantages will be apparent from the following description and accompanying drawing.

In accordance with the present invention refining of crude nuclear chlorinated aromatic hydrocarbons involving separation of impurities containing corrosive compounds may be accomplished by subjecting the crude nuclear chlorinated aromatic hydrocarbons to steam rectification, maintaining a body of caustic solution in the rectification zone, introducing ammonia into the rectification zone, removing the desired chlorinated products as overhead distillate from the rectification zone leaving as bottoms the impurities in the crude nuclear chlorinated aromatic hydrocarbons.

More specifically, the present invention involves continuously introducing a stream of crude chlorinated benzenes resulting from the reaction of chlorine with benzene containing a major amount of monochlorobenzene and dichlorobenzene and a minor amount of impurities into a rectification zone, maintaining a liquid body of caustic solution in the bottom of the rectification zone, continuously introducing steam into the rectification zone in direct contact with the crude benzenes therein, continuously supplying heat to the material in the rectification zone to aid in rectifying the crude therein, continuously introducing ammonia into the rectification zone, continuously removing as overhead from the rectification zone a distillate boiling not higher than dichlorobenzene, and continuously returning distillate as reflux condensate to the rectification zone.

The accompanying drawing is a diagrammatic flow sheet illustrating one method of practicing the present invention.

Referring to the drawing, benzene from an external source through line 1 and recycle benzene from line 2 are introduced through line 3 into reactor 4 into which chlorine from line 5 is passed in direct contact with the benzene. The benzene and chlorine react in chlorinator 4 to give primarily chlorinated benzenes and HCl. The HCl together with other noncondensable gases are released from chlorinator 4 through line 6; the HCl is sent to an acid recovery system where it is converted to muriatic acid. The benzene going into chlorinator 4 through lines 1 and 2 comes from two sources, primarily as nitration grade benzol supplied to the plant from the outside, and, secondarily, as recycle benzene going back into the process after it has been separated from the crude chlorinated benzenes. The impurities detected in the benzene from one source or another may be listed as follows:

Water
Carbon disulfide
Toluene
n-Hexane
Cyclohexane
n-Heptane
Thiophene
Unsaturated hydrocarbons The reason these impurities are mentioned is not because they are particularly corrosive in themselves, but because they react in the chlorinator to produce compounds which are of a corrosive nature. Chlorine, the other raw material used in the production of chlorinated benzenes, usually contains as impurities about 100 to 200 parts per million of bromine and small amounts of inert gases such as air and hydrogen.

The crude chlorinated benzene mixture produced in chlorinator 4 generally consists of a mixture of about 65–80% monochlorobenzene, 8–16% dichlorobenzene, 8–15% benzene and about 1% other ingredients, i. e. impurities which contain the actual and potential corrosion constituents. While the amount of these impurities is small in amount relative to the total crude mixture, nevertheless, experience has shown that when the crude mixture is subjected to conventional fractionation to separate the desired chlorinated products, rapid destruction of the fractionating equipment results so as to make the operation difficult and costly.

The crude chlorinated benzenes are withdrawn from chlorinator 4 and forced by pump 7 through line 8 into neutralizer 9 which in form is a vessel having a conical bottom and provided with a stirrer 11. The principal function of the neutralizer is to remove HCl and FeCl₃. In addition to this, it removes some of the other acidic compounds present in the crude, but for the most part the impurities in the neutralized crude are the same as before neutralization. In other words, neutralization of the crude chlorinated benzenes, prior to refining of the crude does not prevent corrosion of the refining equipment. A caustic solution such as caustic soda or soda ash in an amount in excess of that required to neutralize the crude chlorinated benzenes is charged into neutralizer 9 and the caustic solution and crude chlorinated benzenes agitated for about 30–60 minutes to obtain good contact between the two liquids and the mixture allowed to settle, about 30–60 minutes, until the liquids separate into an upper layer of neutralized chlorinated benzenes and a lower layer of spent caustic. The spent caustic is discharged from the neutralizer through valve 12 and line 13 and desirably sent to a steam still for recovery of entrained oil. In practice we have found that a single batch of caustic solution may be employed to neutralize several successive batches of chlorinated crude. Of course, other conventional methods such as continuous operation may be employed in neutralizing the crude chlorinated benzene.

The neutralized chlorinated benzenes are sent by pump 14 through line 15 into steam rectification still 16. The steam rectification still may be constructed of a fractionating column of about 3–6 feet in diameter and about 40–50 feet in height and containing about 18–23 plates, desirably of the bubble-cap type. The fractionating column is disposed above and in communication with an enlarged vessel termed "still pot" enclosing a closed steam coil 17 which provides heat for vaporization of the crude mixture. Steam is introduced through line 18 in direct contact with the contents of steam rectification still 16. A body of caustic solution such as caustic soda or caustic potash, preferably of about 45–60% concentration, is maintained in the still pot desirably with sufficient solution to cover the closed steam coil 17 therein.

In operation the crude chlorinated benzene mixture is continuously fed through line 15 into still 16 wherein the desired chlorinated products are distilled overhead by means of heat supplied to closed steam coil 17 and also by the direct introduction of steam through line 18 into still 16. During the distillation operation ammonia is continuously introduced through line 19 into still 16 at a point near the bottom of the fractionating column. The steam distillation is controlled by means of heat supplied to coil 17, steam entering the still through line 18, rate of feed through line 15 and return of reflux condensate so as to remove as vapors from the top of still 16 a distillate having a boiling point not higher than dichlorbenzene. Rectification may be conveniently carried out at atmospheric pressure; subatmospheric and superatmospheric pressures are unnecessary. The overhead from still 16 composed of monochlorobenzene, dichlorobenzene, benzene, water vapor and incidental amounts of other constituents including noncondensable gases, passes through line 21 into water cooled condenser 22 wherein the vapors of chlorinated benzenes and water are condensed and the condensate then flows through line 23 into receiver 24. Non-condensable gases and vapors are released from the top of receiver 24 through line 25 and valve 26. Liquid condensate collecting in receiver 24 separates into a lower oil layer of crude chlorinated benzenes condensate and an upper layer of water, which latter is withdrawn and discarded from the system through line 27 and valve 28. A portion of the chlorinated benzenes condensate is returned from receiver 24 by pump 29 through line 31 to the top of steam rectification still 16. The return of copious reflux condensate, desirably in excess of 25% and preferably in excess of 50%, of the distillate released from the top of still 16 serves several important functions including prevention of carrying over in the vapor heavier constituents which may cause contamination of the product and corrosion of a subsequent fractionating equipment, aids in controlling the temperature at the top of the fractionating column of still 16, and, further, aids in rectifying the crude mixture, i. e. effecting sharper separation of the desired chlorinated product from the impurities. In practical commercial operation we have found that rectification may be continuously carried out for a period of in excess of 15 days after which time the run is terminated and the liquid residue containing the impurities is discharged through line 32 and valve 33, rectification still 16 washed out and a new charge of caustic soda solution placed in the fractionating column for another run.

In our experimental work leading up to the development of the present invention we have carried out tests wherein the crude chlorinated benzenes were steam distilled in the presence and in the absence of caustic soda solution without success in retarding the rapid corrosion of the equipment. Only when we apply the combination of separating the desired chlorinated benzene products from the crude chlorinated benzene mixture by steam rectification of the crude mixture in the presence of both caustic and ammonia as described herein did we succeed in reducing corrosion to a point where it was negligible. It should be noted that not only is it necessary to eliminate corrosion in the steam rectification still but it is also necessary to produce a distillate substantially free from corrosive constituents since the distillate is subsequently subjected to further fractionation and if the distillate contains corrosive constituents the subsequent fractionating equipment will rapidly deteriorate due to corrosion. In this connection we carried out tests wherein crude chlorinated benzenes were steam distilled without rectification and found the distillate product to be contaminated with corrosive constituents which caused appreciable corrosion in the subsequent fractionating column for separating the distillate into pure chlorinated benzene compounds. We are unable to give a complete explanation or theory of the chemical or physical reactions involved in the process of the present invention and the reasons for the particular combination inhibiting corrosion and producing a product substantially free of corrosive constituents.

Although water is separated from crude chlorinated benzenes condensate in receiver 24, the condensate retains small amounts of moisture and to remove this moisture the condensate is directed by pump 34 through line 35 into a suitable dryer 36, for example one containing cube caustic. The dried condensate is then directed by pump 37 through line 38 into still 39 which may be of any conventional type, either batch or continuous, to effect removal of benzene from the crude chlorinated benzene condensate. As illustrated in the drawing, still 39 may be a column equipped with plates and provided with heating means such as steam coil 41 to volatilize the benzene from the condensate which benzene vapors are released from the still through line 42, condensed in condenser 43 and the condensate directed through line 44 into receiver 45, and a portion returned as reflux to the top of still 39 by pump 40 via line 50. The benzene collected in receiver 45 may be returned by pump 46 through lines 2 and 3 to chlorinator 4 for further reaction with chlorine to produce additional chlorinated benzenes.

The bottoms from still 39 consisting of chlorinated benzenes substantially free from benzene are sent by pump 47 through line 48 to still 49 of any suitable type for separation and removal of monochlorobenzene. As illustrated in the drawing, chlorinated benzenes entering still 49 are heated by steam coil 51 to volatilize monochlorobenzene therefrom and the monochlorobenzene vapors released from still 49 through line 52, condensed in condenser 53 and the condensate passed through line 54 into receiver 55, and thence substantially pure monochlorobenzene directed to storage through line 56 and valve 57. A portion of the monochlorobenzene is returned as reflux to the top of still 49 by pump 60 through line 63.

The dichlorobenzenes, para-dichlorobenzene and ortho-dichlorobenzene, remaining as bottoms in still 49 are withdrawn by pump 58 and directed through line 59 into still 61 for separation of ortho-dichlorobenzene and para-dichlorobenzene. Distillation of the dichlorobenzenes may conveniently be carried out in a batch type operation. Still 61 is first charged with a batch of dichlorobenzene. Dichlorobenzene is then vaporized by means of heat supplied from steam coil 62 and evolved vapors of para-dichlorobenzene are released from the still through line 64, condensed in condenser 65 and the condensate passed through line 66 into receiver 67. A portion of the condensate is returned as reflux by pump 70 through line 68 to the top of still 61. The substantially pure para-dichlorobenzene is directed to storage through line 69. After the para-dichlorobenzene has been removed from the chlorinated benzenes the bottoms consisting essentially of ortho-dichlorobenzene are discharged from still 61 through line 71 and valve 72. Sometimes the ortho-dichlorobenzene bottoms do not have a sufficiently light color, in which event the ortho-dichlorobenzene is redistilled to remove color as a final purification.

Surge tanks are desirably provided between the steps of the process for the purpose of temporarily storing the intermediate products produced during the operation.

The following example illustrates the present invention:

Benzene was chlorinated with $Cl_2$ in the presence of $FeCl_3$ catalyst to produce a crude chlorinated benzene mixture consisting principally of 12% benzene, 74% monochlorobenzene, 13% dichlorobenzene and about 1% other ingredients (impurities). The crude chlorinated benzene mixture was then mixed with an excess of caustic soda solution of about 50% concentration, the mixture agitated and then permitted to settle and separate into a neutralized chlorinated benzene layer and a spent caustic layer. The neutralized crude chlorinated benzene was then continuously fed to a rectification still constructed of a distilling column four feet in diameter having 24 bubble-cap plates, superimposed on an enlarged still pot enclosing a closed steam coil. The crude chlorinated benzene was fed into the rectification still at the rate of 10 gallons per minute. Ammonia gas was introduced at the bottom of the distilling column at the rate of 30 to 50 cubic feet per hour. Prior to the introduction of crude chlorinated benzene in the still the still is charged with a caustic soda solution of 50–55% concentration with sufficient solution to cover the closed steam coil in the still pot. Direct steam is introduced to the pot and heat applied by the closed steam coil to maintain the caustic soda solution at the 50–55% concentration. Vapors released from the rectification still were condensed and collected in a receiver wherein the condensate separated into an upper water layer and a lower chlorinated benzene layer. The water layer was discharged from the system. A portion of the condensate layer at the rate of 5 gallons per minute was returned to the top of the distilling column as reflux condensate. The remaining condensate layer was a product of the steam rectification still. This distillation was continuously conducted for 15 days, at the end of which time the run was terminated, the still pot liquors were dumped and the still washed out. The still was then ready to be recharged with caustic soda solution for another run. Numerous operations, as above described, were conducted in the steam rectification still and the still periodically examined for signs of corrosion. No corrosion of significance occurred in the steam rectification still. The chlorinated benzene distillate product taken as overhead from the steam rectification was found to be substantially free from corrosive constituents.

The process of the present invention is applicable to the treatment of mixtures other than crude chlorinated benzenes, as for example nuclear chlorinated aromatic hydrocarbons such as chlorinated toluenes, chlorinated xylenes, chlorinated naphthalenes and chlorinated thiophenes.

Although certain preferred embodiments of the invention have been disclosed for purpose of illustration it will be evident that various changes and modifications may be made therein without departing from the scope and spirit of the invention.

1. A method of refining crude nuclear chlorinated aromatic hydrocarbons selected from the group consisting of chlorinated benzenes, chlorinated toluenes, chlorinated xylenes, chlorinated naphthalenes and chlorinated thiophenes involving separation of impurities containing corrosive compounds which comprises subjecting the crude nuclear chlorinated aromatic hydrocarbons to steam rectification, maintaining a body of caustic solution in the rectification zone, introducing ammonia into the rectification zone, removing the desired chlorinated products as overhead from the rectification zone leaving as bottoms the impurities in the crude nuclear chlorinated aromatic hydrocarbons.

2. A method of refining crude chlorinated benzenes resulting from the reaction of chlorine with benzene and containing a major amount of monochlorobenzene, dichlorobenzene and benzene and a minor amount of impurities which comprises introducing the crude chlorinated benzenes into a rectification zone, maintaining a body of caustic solution in the rectification zone, introducing steam into the rectification zone to effect steam distillation of the crude benzenes therein, introducing ammonia into the rectification zone, removing as overhead from the rectification zone a distillate boiling not higher than dichlorobenzene, and returning distillate as reflux condensate to the rectification zone.

3. A method of refining crude chlorinated benzenes resulting from the reaction of chlorine with benzene and containing a major amount of monochlorobenzene, dichlorobenzene and benzene and a minor amount of impurities which comprises continuously introducing a stream of the crude chlorinated benzenes into a rectification zone, maintaining a liquid body of caustic solution in the bottom of the rectification zone, continuously introducing steam into the rectification zone in direct contact with the crude chlorinated benzenes therein, continuously supplying heat to the material in the rectification zone to aid in vaporizing the crude chlorinated benzenes therein, continuously introducing ammonia into the rectification zone, continuously removing as overhead from the rectification zone a distillate boiling not higher than dichlorobenzene, and continuously returning distillate as reflux condensate to the rectification zone.

4. A method of refining crude chlorinated benzenes resulting from the reaction of chlorine with benzene and containing a major amount of monochlorobenzene, dichlorobenzene and benzene and a minor amount of impurities which comprises continuously introducing a stream of the crude chlorinated benzenes into a rectification zone, maintaining a liquid body of caustic solution of about 45–60% concentration in the bottom of the rectification zone, continuously introducing steam into the rectification zone in direct contact with crude chlorinated benzenes therein, continuously supplying heat to the material in the rectification zone to aid in vaporizing the crude chlorinated benzenes therein, continuously introducing ammonia into the rectification zone, continuously removing as overhead from the rectification zone a distillate boiling not higher than dichlorobenzene, and continuously returning distillate as reflux condensate in an amount in excess of 25% of the distillate removed as overhead to the rectification zone.

5. A method of refining crude chlorinated benzenes resulting from the reaction of chlorine with benzene and containing a major amount of monochlorobenzene, dichlorobenzene and benzene and a minor amount of impurities which comprises continuously introducing a stream of the crude chlorinated benzenes into a rectification zone, maintaining a liquid body of caustic solution of about 45–60% concentration in the bottom of the rectification zone, continuously introducing steam into the rectification zone in direct contact with crude chlorinated benzenes therein, continuously supplying heat to the material in the rectification zone to aid in vaporizing the crude chlorinated benzenes therein, continuously introducing ammonia into the rectification zone, continuously removing as overhead from the rectification zone a distillate boiling not higher than dichlorobenzene, continuously returning distillate as reflux condensate in an amount in excess of 25% of the distillate removed as overhead to the rectification zone, and distilling the distillate from the rectification zone to separate it into a fraction comprising benzene, a fraction comprising monochlorobenzene and a fraction comprising dichlorobenzene.

6. In a method of refining nuclear chlorinated aromatic hydrocarbon mixtures selected from the group consisting of chlorinated benzenes, chlorinated toluenes, chlorinated xylenes, chlorinated naphthalenes and chlorinated thiophenes containing as impurities corrosive compounds, the improvement which comprises subjecting the crude nuclear chlorinated aromatic hydrocarbon mixture to steam rectification in the presence of both caustic solution and ammonia, removing the desired chlorinated product as distillate from the mixture and leaving as bottoms the impurities in the nuclear chlorinated aromatic hydrocarbon mixture.

DELBERT L. HANNA.
BARNEY O. STROM.

References Cited in the file of this patent

UNITED STATES PATENTS

| Number | Name | Date |
|---|---|---|
| 2,003,234 | Bennett | May 28, 1935 |
| 2,069,183 | Hanson | Jan. 26, 1937 |
| 2,096,735 | Dinley | Oct. 26, 1937 |
| 2,231,026 | Quattlebaum | Feb. 11, 1941 |
| 2,435,887 | Hornbacher et al. | Feb. 10, 1948 |
| 2,527,606 | Webb | Oct. 31, 1950 |
| 2,558,624 | Murray | June 26, 1951 |
| 2,589,212 | Agapetus et al. | Mar. 18, 1952 |